(12) United States Patent
Dussaud et al.

(10) Patent No.: US 6,840,006 B2
(45) Date of Patent: Jan. 11, 2005

(54) ACCELERATED MULCHING PAPER DEGRADATION PROCESS AND MULCHING PAPER FOR IMPLEMENTING THE PROCESS

(75) Inventors: Joseph Dussaud, Vienne (FR); Léonie Bouvier, Beauvoir de Marc (FR)

(73) Assignee: Ahlstrom Research & Services, Pont Eveque (FR)

( * ) Notice: Subject to any disclaimer, the term of this patent is extended or adjusted under 35 U.S.C. 154(b) by 59 days.

(21) Appl. No.: 10/426,197

(22) Filed: Apr. 30, 2003

(65) Prior Publication Data

US 2003/0192236 A1 Oct. 16, 2003

Related U.S. Application Data

(62) Division of application No. 09/680,372, filed on Oct. 5, 2000, now Pat. No. 6,578,315.

(30) Foreign Application Priority Data

Oct. 5, 1999 (FR) .............................................. 99 12600

(51) Int. Cl.[7] .......................... D21H 17/22; C09K 17/52
(52) U.S. Cl. .............................. 47/9; 162/158; 162/166
(58) Field of Search ........................ 47/9, 56; 428/502, 428/504, 505, 507, 511; 162/166, 164.6, 158; 111/102, 144; 528/332; 435/187

(56) References Cited

U.S. PATENT DOCUMENTS

| | | | | |
|---|---|---|---|---|
| 3,950,282 A | * | 4/1976 | Gilbert et al. | 260/DIG. 43 |
| 4,944,734 A | * | 7/1990 | Wallach | 604/358 |
| 4,980,023 A | * | 12/1990 | Salkinoja-Salonen | 162/135 |
| 5,133,909 A | * | 7/1992 | Suominen | 264/7 |
| 5,262,208 A | * | 11/1993 | Krapivina et al. | 427/255.6 |
| 5,350,783 A | * | 9/1994 | Reich | 523/124 |
| 5,391,423 A | * | 2/1995 | Wnuk et al. | 428/217 |
| 5,478,386 A | * | 12/1995 | Itoh et al. | 428/532 |
| 5,545,547 A | * | 8/1996 | Kolattukudy et al. | 424/94.1 |
| 5,672,434 A | * | 9/1997 | Dalebroux et al. | 428/537.5 |
| 5,720,803 A | * | 2/1998 | Itoh et al. | 106/168.01 |
| 5,762,678 A | * | 6/1998 | Hiles | 71/23 |
| 5,866,269 A | * | 2/1999 | Dalebroux et al. | 428/537.5 |
| 5,885,602 A | * | 3/1999 | Levy | 424/404 |
| 5,936,045 A | * | 8/1999 | Warzelhan et al. | 525/411 |
| 6,071,711 A | * | 6/2000 | Koch | 435/18 |
| 6,255,451 B1 | * | 7/2001 | Koch et al. | 435/18 |
| 6,312,823 B1 | * | 11/2001 | El-Afandi et al. | 156/244.11 |
| 6,312,826 B1 | * | 11/2001 | Shogren | 428/507 |
| 6,578,315 B1 | * | 6/2003 | Dussaud et al. | 47/9 |

FOREIGN PATENT DOCUMENTS

| | | | | | |
|---|---|---|---|---|---|
| CA | 2125815 A | * | 9/1995 | | A01G/13/02 |
| CN | 1124085 A | * | 6/1996 | | A01G/13/02 |
| CN | 1217351 A | * | 5/1999 | | C08J/5/18 |
| EP | 0421413 A1 | * | 4/1991 | | |
| SU | 1664938 A1 | * | 7/1991 | | D21H/11/00 |
| WO | WO 01/25536 A1 | * | 4/2001 | | C09K/17/52 |

OTHER PUBLICATIONS

Lancaster, John C., "Biotechnology: Is It Working For You?", Oct. 1998, The Pumper magazine.*

* cited by examiner

Primary Examiner—Jeffrey L. Gellner
(74) Attorney, Agent, or Firm—Heslin Rothenburg Farley & Mesiti P.C.; Mary Louise Gioeni, Esq.

(57) ABSTRACT

Accelerated degradation of mulching paper, formed from cellulose fibers impregnated with a hydrophobic resin to provide weather resistance, comprises spraying the paper with an enzyme solution which degrades both the resin and the cellulose.

8 Claims, 3 Drawing Sheets

FIG. 2

| | | T | | | | | T+3 days | | | | | T+6 days | | | | | T+9 days | | | | | T+12 days | | | | |
|---|---|---|---|---|---|---|---|---|---|---|---|---|---|---|---|---|---|---|---|---|---|---|---|---|---|---|
| | | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
| State of the out-of-the-soil part | Tension strength | X | | | | | X | | | | | X | | | | | X | | | | | X | | | | |
| | Development of fungi | X | | | | | X | | | | | X | | | | | X | | | | | X | | | | |
| State of the buried part | Tearing strength at the surface of the soil | X | | | | | X | | | | | X | | | | | X | | | | | | | X | | | |
| | Tensile strength | X | | | | | X | | | | | X | | | | | X | | | | | X | | | | |
| | Degradation | X | | | | | X | | | | | X | | | | | X | | | | | | | | X | | |
| | Development of fungi | X | | | | | X | | | | | X | | | | | X | | | | | | | | X | | |

Rating scale:
- 0 very high/very good state
- 1 high/good state
- 2 average
- 3 low
- 4 very low/poor

ACCELERATED MULCHING PAPER DEGRADATION PROCESS AND MULCHING PAPER FOR IMPLEMENTING THE PROCESS

CROSS REFERENCE TO RELATED APPLICATIONS

This application is a divisional of U.S. patent application Ser. No. 09/680,372, filed Oct. 5, 2000, now U.S. Pat. No. 6,578,315, which claims priority from French Patent Application No. 99.12600, filed on Oct. 5, 1999, the entire disclosures of which are incorporated herein by reference.

The invention relates to a mulching paper degradation process as well as to the mulching paper for implementing the process. As will be described below, the invention also relates to an enzymatic solution for implementing the said process.

In the rest of the description, the degradation process and the mulching paper of the invention are more particularly described in relation to the mulching of lettuces.

However, the paper applies to the mulching of all types of plants, such as strawberry plants, vines, tomatoes, courgettes, aubergines, peppers, cucumbers, shallots, etc.

Several mulching materials have been proposed.

Firstly, black plastic sheeting is known which has the advantage of being strong, despite its low weight per unit area, and thus being weather-resistant. However, such plastic sheeting has a certain number of drawbacks, especially that of not being biodegradable. For obvious environmental reasons, plastic cannot be buried in the soil. Consequently, when the harvesting has been completed and the grower wishes to plough his land, he must completely remove the plastic. The cost of this operation is estimated to be 20% of the total cost of the mulching.

Moreover, since the plastic heats up very quickly when exposed to solar rays, the lettuce leaves close to the ground adhere and remain adhered to the mulching film and therefore can only be removed with removal of this film. It is estimated that the removal of one ton of plastic entails the removal of one ton of plants and earth that have remained attached to the said plastic. Consequently, the plastic is virtually unrecyclable, the cost of washing it being unacceptably high for such an operation.

To solve these various problems, mulching papers have been developed at the same time. Such papers, more particularly described in documents FR-A-2,016,071, are treated with urea-formaldehyde resins so as to increase their wet strength and thus decrease the risk of tearing when used on the ground.

However, despite this treatment, the paper can break due to the effect of the watering phases, which expand the paper, and of the drying phases which retighten the paper.

Moreover, and above all, the treatment of the paper with hydrophobic resins inevitably results in its biodegradability slowing down. It has in fact been found that complete biodegradation of these types of paper is achieved only after 2 years.

In other words, one is faced with the complex problem of using a mulching paper which is weather resistant over a defined period but which at the same time can be degraded in a minimum time after harvesting.

To solve this problem, the Applicant has developed a process for the accelerated degradation of mulching paper whose cellulose fibres are impregnated with a hydrophobic resin giving the said paper a weather-resistant character, in which an enzymatic solution capable of degrading both the resin and the cellulose is sprayed on to the paper.

In other words, the process of the invention consists in depositing over the growing area a paper whose fibres are impregnated with a resin providing it with wet strength, and therefore making it non-tearable, while being compatible with the period of use. Thus with regard to strawberry plants, for example, the paper must be kept in place over the growing area for 9 months, whereas this period is only 6 weeks in the case of lettuces. After harvesting, the paper is degraded by spraying an enzymatic solution, the said solution allowing not only the rate of degradation of the cellulose to be considerably accelerated but also preventing any accumulation of resin in the soil by degradation of the resin. To further accelerate the degradation of the paper, the ground is then ploughed so as to bury the paper in the soil.

According to a first characteristic of the process of the invention, the hydrophobic resin is chosen from the group comprising urea-formaldehyde resins, melamine-formaldehyde resins, polyamide-amine-epichlorohydrin resins, polyethyleneimine resins and starch derivatives, by themselves or as a mixture.

These resins are known to those skilled in the art and are specifically described in document "le point sur . . . ", No. 11, January 1986 from Centre Technique du Papier de Grenoble [*Grenoble Paper Technical Centre*].

In one advantageous embodiment, the chosen resins are polyamide-amine-epichlorohydrin resins.

Moreover, in order to degrade not only the resin but also the cellulose, the enzymatic solution comprises enzymes capable of catalyzing the hydrolysis of resin-resin, resin-cellulose and cellulose-cellulose bonds.

In the rest of the description and in the claims, the expression "resin-resin bonds" should be understood to mean the hydrolyzable bonds between monomers of the resin.

Likewise, the expression "resin-cellulose bonds" should be understood to mean the ester bonds linking the resin to the cellulose.

Finally, the expression "cellulose-cellulose bonds" should be understood to mean the glycosidic bonds of the cellulose.

To catalyze the hydrolysis of the ester bonds linking the resin to the cellulose, the enzyme chosen will be an esterase.

Likewise, to catalyze the hydrolysis of the glycosidic bonds of the cellulose, the enzyme will be a cellulase chosen from the group comprising exocellobiohydrolases, endoglucanases and β-glucosidases, alone or as a mixture.

Finally, the choice of enzyme capable of catalyzing the hydrolysis of the bonds between monomers forming the resin will be chosen depending on the nature of the said bonds.

In practice, with regard to polyamide-amine-epichlorohydrin resins, the enzyme will be chosen from the group comprising amidases and aminases.

As already stated, the invention also relates to the mulching paper for implementing the process described above.

Apart from the fact that the mulching paper of the invention must have a composition such that it can be degraded according to the process described above, it must also have a certain number of properties allowing it to be used as mulching material.

Thus, the paper must be resistant to the weather, such as rain and wind, and to extreme temperature conditions, such as cold and hot conditions, and consequently must have excellent mechanical properties.

Consequently, the Applicant was set the objective of obtaining a paper having a bursting strength of between 150 and 250 kPa.

Another characteristic that the paper must have is that of being permeable to water in so far as the spraying water must be able to irrigate the soil and the roots of the plants. However, the pores in the paper must have a volume such that they limit the evaporation of water lying beneath the mulching so as to preserve sufficient moisture in the soil.

To obtain such properties, the Applicant set the objective of obtaining a paper having an air permeability of between 1500 and 3500 $cm^3$ over an area of 10 $cm^2$ under a vacuum of 1 kPa in sixty seconds.

To achieve all these objectives, the mulching paper of the invention is characterized in that it comprises a fibrous composition containing, by weight:

from 40 to 60%, advantageously 50%, coniferous unbleached kraft paper pulp;

from 10 to 30%, advantageously 20%, deciduous unbleached kraft paper pulp;

from 20 to 40%, advantageously 30%, deinked packaging pulps.

The unbleached kraft paper pulps and their method of manufacture are well known to those skilled in the art. Likewise, the deinked packaging pulps are known as resulting from packaging residues.

According to another characteristic, the mulching paper furthermore contains from 0.5 to 15% resin, advantageously from 7 to 8%, resin by weight with respect to the weight of the paper.

For a resin concentration of less than 0.5% by weight, the paper does not have a sufficiently high wet strength and it tears during spraying or when it rains. For a resin concentration of greater than 15% by weight, a paper having optimized mechanical properties is not obtained, so that the paper becomes economically less advantageous.

Moreover, to avoid the development of microorganisms on the surface of the paper, the paper furthermore contains a fungistatic agent.

In one advantageous embodiment, the fungistatic agent is distributed only over those areas of the paper sheet which are intended to be buried. In this case, the fungistatic agent is deposited at the wet end of the paper machine by spraying it using air-pressurized nozzles.

In addition, in order to increase the extensibility of the paper when the crops are sprayed, while still preventing it from breaking when drying out, the paper is in creped form. This pleating obtained by a creping operation on the paper machine furthermore makes it possible to adapt the paper, on the one hand, to the contour of the ground by accepting the slight curvatures in the latter and, on the other hand, to its dimensional variations due to the action of the successive spraying and drying phases.

The invention also relates to the enzymatic solution for implementing the accelerated mulching paper degradation process described above.

Of course, and as has been already stated, the composition of the said enzymatic solution will vary depending on the resin used and on the nature of the sites at which the said enzymes must act.

However, and in practice, the solution always contains cellulases capable of breaking the cellulose-cellulose bonds and esterases capable of breaking the resin-cellulose bonds.

According to an advantageous embodiment, the enzymatic solution contains, by weight:

from 10 to 20% cellulase;

from 15 to 40% amidase;

from 15 to 40% esterase;

from 10 to 35% aminase.

In practice, the enzymatic solution is sprayed in an amount of 0.01 to 1 g, advantageously 0.3 to 0.4 g, of pure enzyme per $m^2$.

In another embodiment of the invention, the enzymatic solution may be incorporated directly into the paper, within microcapsules.

Consequently, the mulching paper will be degraded after harvesting, after being buried in the soil, especially by ploughing, that is to say when the walls of the microcapsules containing the enzymatic solution have broken due to the mechanical action.

In other words, the invention also relates to a mulching paper capable of rapidly degrading after being buried in the soil, the cellulose fibres of which are impregnated with a hydrophobic resin giving the said paper a weather-resistant character, characterized in that it furthermore comprises microcapsules filled with an enzymatic solution, the walls of which microcapsules are broken during burying in the soil, thus releasing the enzymes capable of catalyzing both the hydrolysis of the resin and that of the cellulose.

The manufacture of the enzymatic solution microcapsules and their incorporation into the paper constitute known operations within the scope of those skilled in the art and will not be described below any further.

Moreover, and as previously, the enzymatic solution contains enzymes capable of catalyzing the hydrolysis of the resin-resin, resin-cellulose and cellulose-cellulose bonds.

Advantageously, the enzymes are chosen from the group comprising esterases, cellulases, amidases and aminases.

In order for the paper to be sufficiently weather resistant, it comprises from 0.5 to 15%, advantageously from 7 to 8%, by weight of resin with respect to the weight of the paper.

The invention and the advantages which stem therefrom will become more apparent from the following illustrative examples.

FIG. 2 shows a table tracking the mechanical properties of the paper of the invention over time.

A. SITE OF ACTION OF THE AQUEOUS ENZYMATIC SOLUTION

FIGS. 1A–1D show the various sites where the enzymes contained in the enzymatic solution of the invention act if the cellulose fibres are impregnated with a polyamide-amine-epichlorohydrin resin.

Figure 1A:
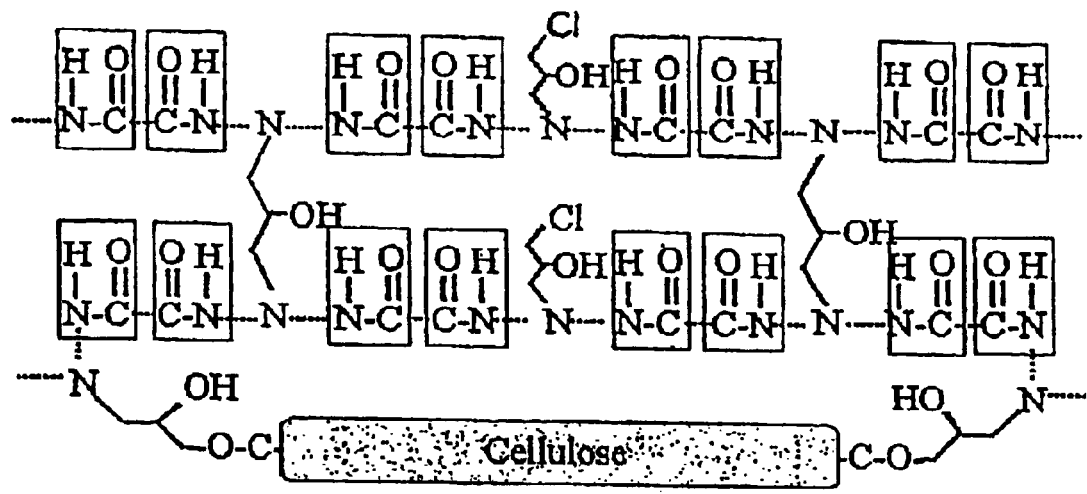
FIGS. 1A–1D show the various sites where the aqueous enzyme solution acts on cellulose fibres coated with a polyamide-amine-epichlorohydrin resin.

FIG. 1a shows, boxed in, the amide bonds which link the monomers of the resin and the hydrolysis of which, during spraying, is catalyzed by enzymes of the amidase type.

Figure 1B:
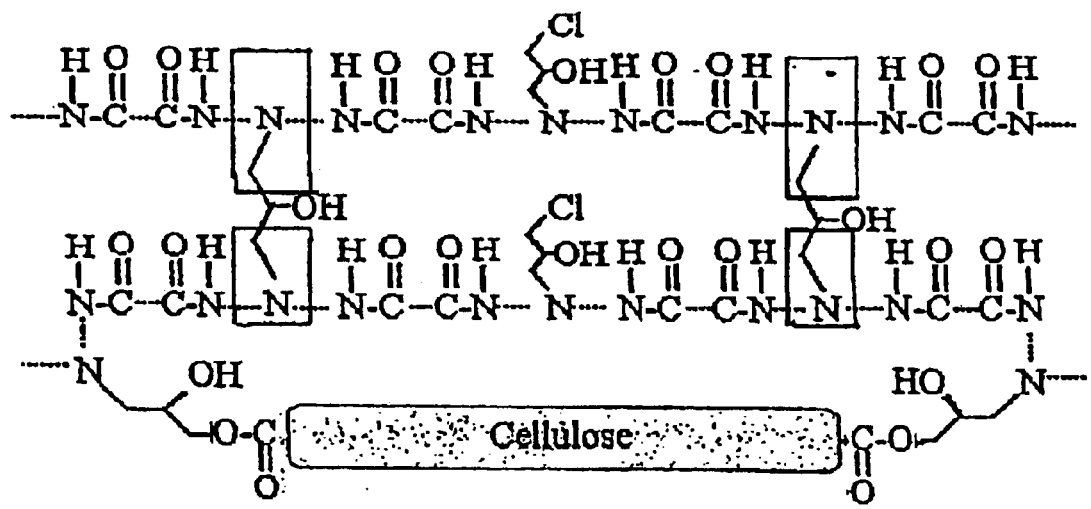

FIG. 1b shows, boxed in, the amine bonds which link the monomers of the resin and the hydrolysis of which, during spraying, is catalyzed by enzymes of the aminase type.

Figure 1C:
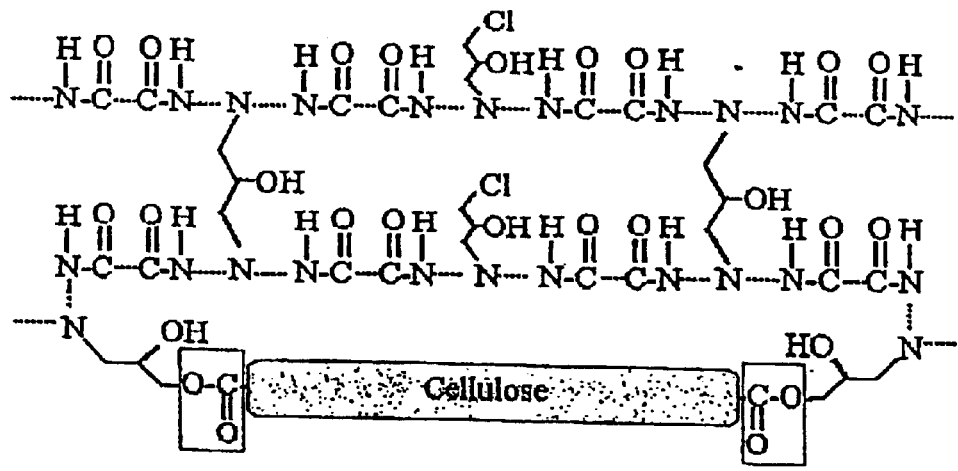

Likewise, FIG. 1c shows, boxed in, the ester bonds which connect the resin to the cellulose and the hydrolysis of which is catalyzed by the presence of enzymes of the esterase type.

Figure 1D:
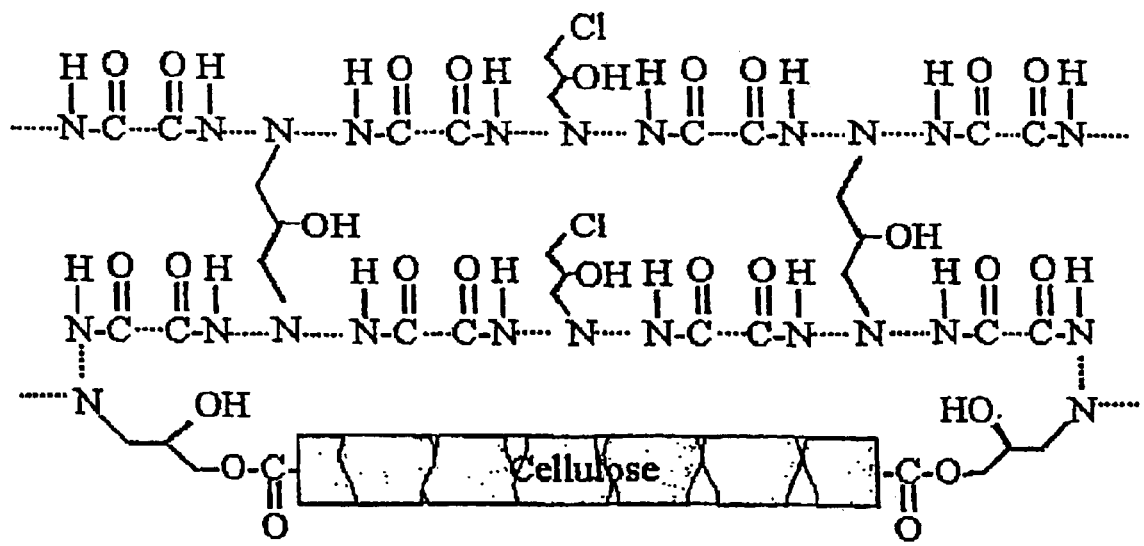

Finally, FIG. 1d shows schematically the glycosidic bonds of the cellulose, the hydrolysis of which is catalyzed by the presence of enzymes of the cellulase type, particularly exocellobiohydrolases, endoglucanases and β-glucosidases.

B. MANUFACTURE OF THE MULCHING PAPER OF THE INVENTION

EXAMPLE 1

A mulching paper with the following composition was prepared:

Fibrous Composition:

| | |
|---|---|
| coniferous unbleached kraft pulp: | 50% |
| deciduous unbleached kraft pulp: | 20% |
| deinked packaging pulps: | 30% |

Colorant:

carbon black: 5.2% with respect to a dry pulp

Additives:

polyamide-amine-epichlorohydrin resin:
   3% with respect to the dry pulp
cationic starch:
   0.8% with respect to the dry pulp.

Next, a sheet of paper is formed from the fibrous suspension on a Fourdrinier-type wire-table paper machine, the paper having the mechanical properties given in the table below:

| PROPERTIES | STANDARDS | UNITS | RESULTS |
|---|---|---|---|
| Grammage | NFQ 03-019 | g/m$^2$ | 75 ± 2 |
| Thickness (at 10 mbar) | NFQ 03-016 | micrometers | 378 |
| Dry tearing force | | | |
| machine direction | NFQ 03-002 | daN/15 mm | 4.55 |
| cross direction | NFQ 03-002 | daN/15 mm | 2.95 |
| Elongation | | | |
| machine direction | NFQ 03-002 | % | 20.5 |
| Wet tearing force | | | |
| machine direction | NFQ 03-056 | daN/15 mm | 1.78 |
| cross direction | NFQ 03-056 | daN/15 mm | 0.96 |
| Bursting strength | NFQ 03-053 | k · Pa | 160 |
| Air permeability | NFQ 03-075 | cm$^3$ (10 cm$^2$, 1 kPa, 60 s) | 2300 |
| Cobb sizing | EN 20 535 | g/m$^2$ | 152 |
| Moisture | NFQ 03-003 | % | 5.8 |

EXAMPLE 2

A mulching paper with the following composition was prepared:

Fibrous Composition:

| | |
|---|---|
| coniferous unbleached kraft pulp: | 50% |
| deciduous unbleached kraft pulp: | 20% |
| deinked packaging pulps: | 30% |

Additives:

melamine-formaldehyde resin:
   5.5% with respect to the dry pulp
cationic starch:
   0.8% with respect to the dry pulp.

The mechanical properties of the paper sheet are given in the table below:

| PROPERTIES | STANDARDS | UNITS | RESULTS |
|---|---|---|---|
| Grammage | NFQ 03-019 | g/m$^2$ | 80 ± 2 |
| Thickness (at 10 mbar) | NFQ 03-016 | micrometers | 363 |
| Dry tearing force | | | |
| machine direction | NFQ 03-002 | daN/15 mm | 4.12 |
| cross direction | NFQ 03-002 | daN/15 mm | 3.05 |
| Elongation | | | |
| machine direction | NFQ 03-002 | % | 19.5 |
| Wet tearing force | | | |
| machine direction | NFQ 03-056 | daN/15 mm | 1.5 |
| cross direction | NFQ 03-056 | daN/15 mm | 1.0 |
| Bursting strength | NFQ 03-053 | k · Pa | 190 |
| Air permeability | NFQ 03-075 | cm$^3$ (10 cm$^2$, 1 kPa, 60 s) | 1250 |
| Cobb sizing | EN 20 535 | g/m$^2$ | 142 |
| Moisture | NFQ 03-003 | % | 5.2 |

To increase the resistance of the paper to the bacteria and fungi contained in the soil, a fungistatic product (FONGICIDE B-350, sold by Intace S.A.) is sprayed, in an amount of 1200 ppm of active substance, in the water line located on the wire of the paper machine.

The spraying is carried out by means of air-pressurized nozzles and controlled so as to deposit on the surface of the paper protective strips which are more resistant than the untreated areas. The product will diffuse into the bulk of the paper together with the water sucked out during the dewatering step. Consequently, when the paper is placed over the growing area, the treated areas will be buried in the soil, whereas the untreated areas will remain on the surface of the soil.

Using the papers manufactured according to Examples 1 and 2, it was also found that they allowed the variations in soil temperature between night and day to be reduced by approximately 4 to 5° C.

Thus, a temperature measurement taken 5 cm from the surface of the cultivated soil for a plastic mulching and for a mulching as proposed in Examples 1 and 2 gives the following temperature variations:

|  | DAY | NIGHT | TEMPERATURE VARIATION |
|---|---|---|---|
| Plastic | 27° C. | 12° C. | 15° C. |
| Patented black paper | 25° C. | 14° C. | 11° C. |

Such a property of the paper is highly advantageous insofar as the smaller the temperature variations between day and night the greater the growth of the plants.

C. TRACKING OF THE MECHANICAL PROPERTIES OF THE PAPER OF THE INVENTION

Various tests were carried out to evaluate the mechanical properties of the paper of the invention.

To do this, trays were filled with compost on which the mulching sheet of the invention was positioned, each of its ends being buried in the earth.

The mulching sheet therefore had a part called the "out-of-the-soil" part and a buried part.

Various parameters, namely the tensile strength and the development of fungi, were evaluated on the out-of-the-soil part.

The tearing strength of the paper level with the surface of the soil, the tensile strength, the degradation and the development of fungi were evaluated on the buried part.

These various parameters were studied under specific conditions, namely a temperature of 28° C. and a moisture-saturated atmosphere having a relative humidity of greater than 95%.

The measurements were carried out every three days. This corresponds in an open-field test to a measurement every nine days. The results are given in the table shown in FIG. 2.

As this table shows, the presence of a fungicide in the composition of the paper prevents any development of fungi over a period of ten growing days, i.e. thirty days in an open field.

Likewise, the tearing strength of the buried part is still satisfactory after thirty growing days, as is the tensile strength.

On the other hand, no degradation of the buried part of the paper was observed, thereby confirming that the resin considerably increases the weather-resistance of the paper.

D. DEGRADATION OF THE PAPER

An enzymatic solution having the following composition by weight was prepared:

15% cellulase;
30% amidase;
30% esterase;
25 aminase.

The solution obtained is diluted to 1% and then sprayed over the paper and the plant residues after harvesting in an amount of 10 to 100 g/m². The ground was then ploughed.

All of the mulching paper had degraded in less than 15 days.

The invention and the advantages which stems therefrom are clearly apparent from the above description.

In particular, it will be noted that the paper of the invention provides, because of its composition and especially of the presence of resin, the advantage of giving it weather resistance, while still being able to be degraded very rapidly in about fifteen days after harvesting, either by spraying an enzymatic solution or by the bursting of the microcapsules of the said enzymatic solution contained in the paper after the ground has been ploughed.

Consequently, the grower has clean ground for a very much lower cost insofar as there is no longer a question of removing the mulching after harvesting. On the contrary, reincorporation into the soil of the plant waste constitutes an excellent green fertilizer.

What is claimed is:

1. Paper capable of rapidly degrading after being buried in soil, said paper comprising cellulose fibres impregnated with a hydrophobic resin having hydrolyzable amide bonds and/or amine bonds, giving the paper a weather-resistant character, and microcapsules filled with an enzymatic solution, wherein the walls of the microcapsules are broken during burying in the soil, and release enzymes capable of catalyzing hydrolysis of the hydrophobic resin and of the cellulose fibres.

2. Paper according to claim 1, wherein the resin is chosen from the group consisting of urea-formaldehyde resins, melamine-formaldehyde resins, polyamide-amine-epichlorohydrin resins, polyethylene-imino resins, by themselves or as a mixture.

3. Paper according to claim 2, wherein the enzymatic solution comprises enzymes capable of catalyzing the hydrolysis of the resin-resin, resin-cellulose and cellulose-cellulose-bonds.

4. Paper according to claim 3, wherein the enzymes are chosen from the group consisting of esterases, cellulases, amidases and aminases.

5. Paper according to claim 1, additionally comprising a fibrous composition containing by weight:

from 40 to 60% coniferous unbleached kraft paper pulp;
   from 10 to 30% deciduous unbleached kraft paper pulp; and
   from 20 to 40% deinked packaging pulps.

6. Paper according to claim 1, comprising from 0.5 to 15% resin by weight with respect to the weight of the paper.

7. Paper according to claim 6, wherein the paper comprises from 7 to 8% resin by weight with respect to the weight of the paper.

8. Paper according to claim 1, additionally comprising at least one starch derivative.

* * * * *

UNITED STATES PATENT AND TRADEMARK OFFICE
CERTIFICATE OF CORRECTION

PATENT NO. : 6,840,006 B2
DATED : January 11, 2005
INVENTOR(S) : Dussaud et al.

It is certified that error appears in the above-identified patent and that said Letters Patent is hereby corrected as shown below:

Column 8,
Line 36, delete the word "polyethylene-imino" and insert -- polyethylene-imine --

Signed and Sealed this

Twelfth Day of July, 2005

JON W. DUDAS
*Director of the United States Patent and Trademark Office*